United States Patent
Andell et al.

(10) Patent No.: US 6,730,756 B1
(45) Date of Patent: May 4, 2004

(54) CATALYST AND PROCESS FOR OLEFIN POLYMERIZATION

(75) Inventors: Ove Andell, Helsinki (FI); Kalle Kallio, Porvoo (FI); Hikka Knuuttitila, Porvoo (FI)

(73) Assignees: Borealis A/S, Lyngby (DK); Peroxid-Chemie GmbH, Pullach (DE)

( * ) Notice: Subject to any disclaimer, the term of this patent is extended or adjusted under 35 U.S.C. 154(b) by 0 days.

(21) Appl. No.: 09/857,370

(22) PCT Filed: Dec. 7, 1999

(86) PCT No.: PCT/GB99/04124

§ 371 (c)(1), (2), (4) Date: Oct. 9, 2001

(87) PCT Pub. No.: WO00/34341

PCT Pub. Date: Jun. 15, 2000

(30) Foreign Application Priority Data

Dec. 7, 1998 (GB) .............................................. 9826874

(51) Int. Cl.$^7$ ................................................. C08F 4/44
(52) U.S. Cl. ...................... 526/161; 526/130; 526/126; 526/172; 526/943; 526/352; 502/103
(58) Field of Search ................................ 526/161, 172, 526/126, 943

(56) References Cited

U.S. PATENT DOCUMENTS

| | | | | | |
|---|---|---|---|---|---|
| 4,892,914 A | * | 1/1990 | Hefner | ........................ | 526/114 |
| 5,122,491 A | * | 6/1992 | Kioka et al. | .................. | 502/117 |
| 5,126,301 A | * | 6/1992 | Tsutsui et al. | ............... | 502/108 |
| 5,194,532 A | * | 3/1993 | Hefner et al. | ................ | 526/126 |
| 5,312,938 A | * | 5/1994 | Hefner et al. | .................. | 556/11 |
| 5,332,706 A | | 7/1994 | Nowlin et al. | ............... | 502/107 |
| 5,587,439 A | * | 12/1996 | DiMaio | ........................ | 526/142 |
| 5,597,935 A | * | 1/1997 | Jordan et al. | .................. | 556/11 |
| 5,700,749 A | * | 12/1997 | Tsutsui et al. | ............... | 502/117 |
| 5,852,143 A | * | 12/1998 | Sishta et al. | ................ | 526/127 |
| 5,998,643 A | * | 12/1999 | Jordan et al. | .................. | 556/11 |
| 6,020,444 A | * | 2/2000 | Riedel et al. | ................ | 526/170 |
| 6,063,726 A | * | 5/2000 | Kioka et al. | ................. | 502/117 |
| 6,153,777 A | * | 11/2000 | Jordan et al. | .................. | 556/11 |
| 6,197,985 B1 | * | 3/2001 | Kobata et al. | ............... | 556/175 |
| 6,207,608 B1 | * | 3/2001 | Jordan et al. | ................ | 502/152 |
| 6,316,562 B1 | * | 11/2001 | Munck et al. | ............... | 526/160 |

FOREIGN PATENT DOCUMENTS

| | | | | |
|---|---|---|---|---|
| EP | 0 206 794 | 12/1986 | | |
| EP | 0 906 914 | 4/1999 | | |
| EP | 1 028 123 A2 | * 8/2000 | ........... | C07F/17/00 |
| WO | WO92/05203 | 4/1992 | | |
| WO | WO93/09148 | 5/1993 | | |
| WO | WO93/23439 | 11/1993 | | |
| WO | WO94/28034 | 12/1994 | | |
| WO | WO95/12622 | 5/1995 | | |
| WO | WO96/00243 | 1/1996 | | |
| WO | WO96/11960 | 4/1996 | | |
| WO | WO 96/11960 A1 | * 4/1996 | ........... | C08F/10/00 |
| WO | WO96/11961 | 4/1996 | | |
| WO | WO 98/56831 A1 | * 12/1998 | ............. | C08F/4/64 |

* cited by examiner

Primary Examiner—David W. Wu
Assistant Examiner—Rip A Lee
(74) Attorney, Agent, or Firm—Nixon & Vanderhye P.C.

(57) ABSTRACT

Olefin polymerization may be catalysed by a wide range of catalytic materials. Described herein is a heterogeneous olefin polymerization catalyst comprising a porous paniculate support material having impregnated therein a metallocene catalyst the metal atom whereof is bound to an amide group which is not bound to an η-ligand of the metallocene, or the reaction product of a said metallocene catalyst and a co-catalyst.

24 Claims, No Drawings

CATALYST AND PROCESS FOR OLEFIN POLYMERIZATION

The present invention relates to improvements in and relating to olefin polymerization, in particular metallocene-catalysed ethylene homo- or copolymerization.

Olefin polymerization may be catalysed by a wide range of catalytic materials. Within the past fifteen or so years however there has been great interest in the so-called metallocene or single site catalysts in which the catalytically active metal (usually a transition metal or lanthanide) is η-liganded by one or more, e.g. 1, 2 or 3, η-ligands, for example cyclopentadienyl, indenyl, tetrahydroindenyl, fluorenyl, etc. ligands. Such catalysts have been described widely in the patents and patent applications of companies such as Hoechst, Exxon, Dow, BASF, Montell, Fina and Mitsui.

Most commonly, the metallocene catalysts described in the literature are of formula A

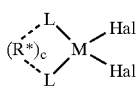 (A)

where M is the catalytically active metal, Hal is a halide such as chloride, each L is an η-ligand, c is 0 or 1 and R*, when present, is a bridging group the linking two η-ligands L together.

Metallocene catalysts are commonly used together with a co-catalyst or catalyst activator, frequently a boron compound or an aluminoxane, for example methylaluminoxane (MAO).

Despite the extensive research that has gone into the development of metallocene olefin-polymerization catalysts over recent years, there is still a need for metallocene catalyst systems with improved properties, e.g. in terms of activity and ability to produce olefin homo- and copolymers having desired characteristics (for example molecular weight distribution, rheology, molecular structure, etc.).

It has now been found that the use of supported metallocene-amides gives rise to just such improved properties.

Thus viewed from one aspect the present invention provides a heterogeneous olefin polymerization catalyst comprising a porous particulate support material having impregnated therein a metallocene catalyst (hereinafter a "metallocene-amide") the metal atom whereof is bound to an amide group which is not bound to a η-ligand of the metallocene, or the reaction product of a said metallocene catalyst and a co-catalyst.

Conveniently, the metallocene amide is of formula I

where n is 1, 2 or 3; a is 0, 1, 2, 3 or 4; b is 1, 2, 3, 4 or 5; n+a+b is the total coordination number for M; M is a catalytically active transition metal or lanthanide; each L, which may be the same or different, is a η-ligand, optionally linked via a bridging group R* to a second group L or to a metal-coordinating group X; each X is a metal coordinating group; and each R, which may be the same or different is a hydrocarbyl group or two groups R, together with the intervening nitrogen, are an optionally substituted, nitrogen bound heterocyclic group, where R (or a heterocyclic group $NR_2$) may contain heteroatoms such as Si, N, P, B, O, S, etc.

In a preferred embodiment, the metallocene-amide is of formula II

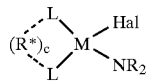 (II)

(where each L is a η-ligand, M is a group 3 to 8 transition metal or a lanthanide, Hal is a halide, c is 0 or 1, R*, where present, is a bridging group linking two η-ligands L, and each R, which may be the same or different, is a hydrocarbyl group containing up to 8 carbons or the two R groups together with the intervening nitrogen form a heterocyclic group having up to 9 ring atoms, and R or $NR_2$ may contain other heteroatoms as mentioned above) or the reaction product of a metallocene of formula I and a co-catalyst.

In the metallocene-amide present in the catalysts according to the invention, the catalytically active metal is preferably zirconium, hafnium or titanium, and such metallocene-amides may be referred to below as zirconocene-amides, hafnocene-amides and titanocene amides.

In the heterogeneous catalyst of the invention, the porous support may be any porous, substantially inert support, such as an inorganic oxide or salt or an organic material, e.g. a metal or pseudometal oxide or halide or an organic polymer, for example silica, alumina, zirconia, silica-alumina, magnesium chloride titanium dioxide, magnesium oxide, aluminium phosphate or an acrylate, methacrylate, polyethylene, polypropylene, polystyrene, or styrene-divinylbenzene polymer. Particularly preferably the support is a fine-grained inorganic oxide such as an inorganic oxide of an element of Group 2(A), 3(B) or 4 of the Periodic Table (Hubbard), most preferably silica, alumina or a mixture or derivative of these.

The support present in the catalyst of the invention is preferably dry. In general, metal oxide supports also contain surface hydroxyl groups which may react with metallocenes or aluminoxanes. Therefore the support can be dehydrated or dehydroxylated before use. Such treatment may be either a thermal treatment or a reaction between the surface hydroxyl groups of the support and a reagent contacted with it. Thus the porous support material is preferably heat treated (calcined) before impregnation, e.g. at a temperature of 200 to 1100° C., preferably 400 to 900° C., for 0.5 to 50 hours, preferably 5 to 20 hours. Such heat treatment is preferably effected in a dry, non-reducing atmosphere, such as oxygen, air or nitrogen. The particle size before heat treatment is preferably in the range 1 to 200 μm, more preferably 5 to 40 μm, the porosity is preferably in the range 0.2 to 3.5 mL/g (more preferably at least 0.9 mL/g) and the surface area is preferably in the range 20 to 1000 m²/g (BET method). Examples of suitable support materials include Grace 955W silica from WR Grace & Co., Sylopol 2109 and Sylopol 55SJ (silicas from Grace Davison), and ES70F and MD747JR (silicas from Crosfield).

The porous support is preferably impregnated with both the metallocene-amide and a co-catalyst, either sequentially or more preferably simultaneously. Where impregnation is simultaneous, the porous support will conveniently become impregnated with the reaction product of the metallocene-amide and the co-catalyst. Preferred as co-catalysts are the aluminoxanes, in particular the $C_{1-10}$ alkylaluminoxanes, most particularly methylaluminoxane (MAO).

Such aluminoxanes may be used as the sole co-catalyst or alternatively may be used together with other co-catalysts. Thus besides or in addition to aluminoxanes, other cation complex forming catalyst activators may be used. In this regard mention may be made of the silver and boron compounds known in the art. What is required of such activators is that they should react with the metallocene-amide to yield an organometallic cation and a non-coordinating anion (see for example the discussion on non-coordinating anions J⁻ in EP-A-617052 (Asahi)).

Aluminoxane co-catalysts are described by Hoechst in WO94/28034. These are linear or cyclic oligomers having up to 40, preferably 3 to 20, —[Al(R")O]— repeat units (where R" is hydrogen, $C_{1-10}$ alkyl (preferably methyl) or $C_{6-18}$ aryl or mixtures thereof).

Where a co-catalyst is used, it may be used separately but more preferably it is also loaded onto the porous support material. In this event it is preferred to allow the catalyst and the co-catalyst to react in a liquid phase and to load the reaction product onto the support. If used separately, the cocatalyst may for example be added into the polymerization reactor together with the supported metallocene-amide.

The support impregnation according to the invention is preferably effected by contacting the support with the metallocene-amide and/or co-catalyst in a liquid, or less preferably a gaseous form, e.g. in solution in an organic solvent. The volume of liquid used is preferably 0.5 to 2.0, more preferably 0.8 to 1.5, especially 0.9 to 1.1, times the pore volume of the support material. Most preferably the volume of liquid is such that an essentially dry mixing occurs, i.e. it is preferred to use a quantity insufficient to form a slurry with the support material.

The loading of porous support materials with catalysts is described at length in WO95/12622 (Borealis), U.S. Pat. No. 5,332,706 (Mobil), EP-A-206794 (Exxon), WO96/00243 (Exxon), WO96/11960 (Exxon), WO96/11961 (Exxon), WO94/28034 (Exxon) and WO93/23439 (Exxon), the disclosures of which are incorporated herein by reference. The dry-mix impregnation procedure of WO95/12622 is especially preferred.

Where metallocene-amide and aluminoxane (or the reaction product thereof) are loaded onto the same support material, the Al:M molar ratio is preferably in the range 5 to 5000, more preferably 10 to 1000, especially 25 to 750, more especially 50 to 500, still more preferably 75 to 400, particularly 100 to 300, e.g. 125 to 250.

The loading of the catalytic metal M on the porous support material is preferably in the range 0.05 to 3% wt. especially 0.1 to 1% wt.

In the impregnation procedure, the metallocene-amide and/or the co-catalyst are preferably dissolved or dispersed in an inert hydrocarbon solvent, e.g. pentane, hexane or more preferably toluene, before being brought into contact with the porous support. After impregnation, the solvent is generally removed, e.g. by the use of elevated temperatures and/or reduced pressures. The impregnation may be effected in a single stage or if desired multiple impregnation/drying stages may be used. Moreover the porous support may if desired be loaded with more than one catalyst and/or more than one co-catalyst. Where more than one catalyst is used, the catalysts may each a metallocene-amide or alternatively one or more may be of a different formula, e.g. it may be a non-metallocene catalyst, a non metallocene-amide catalyst, etc.

It has surprisingly been found that high catalytic activity with much lower than normal Al:Zr ratios can be acheived with the zirconocene-amides, especially those having a bridged bis-η-ligand, e.g. a bis-indenyl ligand. Since the aluminium-based co-catalysts are extremely expensive this means the catalyst contribution to the expense of olefin polymerization may be reduced. Thus viewed from a further aspect the invention provides a process for the production of an olefin polymer comprising polymerizing an olefin monomer in a polymerization vessel in the presence of a zirconocene catalyst and an aluminum-containing co-catalyst or the reaction product of said catalyst and co-catalyst, characterised in that in said zirconocene zirconium is bound to an amide group which is not bound to an η-ligand and in that the molar ratio of aluminium to zirconium in the polymerization reaction mixture in said vessel during polymerization is less than 400 (especially less than 300, more especially less than 100, e.g. 25 to 85) and said catalyst or reaction product is pre-loaded onto a porous particulate support.

The use of such low Al:Zr molar ratios is particularly effective for olefin homopolymerization reactions, especially ethylene homopolymerizations and propylene homopolymerizations, and where the metalocene-amide contains a bridged bis-η-ligand.

The polymerization process may be for example liquid phase, gas phase, slurry phase, high pressure, etc. and as indicated above heterogeneous catalysts may be used.

By contrast, and again surprisingly, the hafnocene-amides achieve high polymerization activity at higher than conventional Al:Hf ratios. Such high Al:Hf ratio catalysts can be used to produce olefin polymers with particularly desirable properties in terms of molecular weight, or monomer incorporation. Thus viewed from a further aspect the invention provides a process for the production of an olefin polymer comprising polymerizing an olefin monomer in a polymerization vessel in the presence of a hafnocene catalyst and an aluminum-containing co-catalyst or the reaction product of said catalyst and co-catalyst, characterised in that in said hafnocene hafnium is bound to an amide group which is not bound to an η-ligand and in that said catalyst or reaction product is pre-loaded onto a porous particulate support.

The support material may additionally be impregnated with further agents, either before, simultaneously with or after impregnation with the metallocene-amide. Such further agents may include, for example, cross-linking agents and surface modifying agents, e.g. alkylating agents.

In the metallocene-amide catalysts of formula I used according to the invention, any halide group (Hal) is conveniently F, Cl, Br or I, but is preferably Br or more preferably Cl, the catalytically effective η-liganded metal (M) is preferably a group 3, 4 or 5 transition metal, especially Zr, Ti or Hf, more especially Zr, and each η-ligand (L) may for example be a mono or polycyclic, homo or heterocyclic η-ligand, optionally ring substituted and optionally joined by a bridge to a further η-ligand (ie. where c=1) which may be the same or different or to a sigma-liganding non-amide group (Z). Other ligands (X), where present will typically be selected from hydrogen and alkyl (especially methyl) and aralkyl (especially benzyl) groups. Particularly preferably the η-ligand is an optionally substituted, optionally bridged cyclopentadienyl, indenyl, fluorenyl or pentalenyl ligand or a ring heteroatom containing analog, (particularly analogs containing a ring nitrogen, sulphur or phosphorus), and especially preferably L is a substituted cyclopentadienyl or bridged bis-indenyl ligand.

Thus, if desired, $L(R^*)_1L$ in the compounds of formula II may represent a single η-ligand substituted by a group R*Z which functions as a sigma-ligand to bind a non-amide metal binding group Z to metal M. Such η/σ difunctional ligands are widely described in the recent patent literature relating to metallocene olefin-polymerization catalysts (see especially the patent publications of Dow).

R* typically will provide an optionally substituted 1 to 5 backbone atom bridge, preferably with the backbone atoms (ie. the atoms in the chain linking L to L or Z) being carbon or silicon. Preferably R* contains 1, 2 or 3 backbone atoms. Suitable bridging groups R* include alkandiyl (e.g. ethylene, 2,2-propandiyl or 1,3-propandiyl), alkandiyl-silyl or silyl groups, e.g. methylene-dimethylsilyl, 2,2-propandiyl-dimethylsilyl, methylene-diphenylsilyl, 2,2-propandiyl-diphenylsilyl, diphenylsilyl and dimethylsilyl.

Thus, otherwise expressed, the metallocene-amides used according to the invention may be of formula III

where c is 0, 1, 2 or 3; R* is a group bridging an η-ligand L and a metal bonding group Z; L is an η-ligand; Z where present is a non-amide group bonded to metal M, e.g. an η-ligand; and R and Hal are as defined above).

Where the η-ligand is a bridged bis-η-ligand, the bridging group is preferably one to four atoms long, e.g. $(CH_3)_2Si$, $(CH_2)_2$, $(C_6H_5)_2Si$, $CH_2(CH_3)_2Si$, etc. as described for R* above. Many examples of suitable bridging groups are described in the patent literature.

Where the η-ligand is a bridged bis-indenyl group, it is especially preferred that the bridging group is attached at the 1-position, that one of the 2-position and the 3-position is substituted (e.g. by a halogen atom; an optionally halogenated $C_{1-10}$ alkyl or $C_{6-10}$ aryl group, a $C_{2-10}$ alkenyl, $C_{3-40}$ aralkyl, $C_{7-40}$ alkaryl, or $C_{8-40}$ aralkenyl group; a silyloxy group; or a $NR^1_2$, $SR^1$, $OR^1$ or $PR^1_2$ group where $R^1$ is halogen, $C_{1-10}$ alkyl, or $C_{6-10}$ aryl).

Where the η-ligand is a cyclopentadienyl group, it is preferably a $C_{1-6}$ alkyl, more preferably n-butyl, substituted cyclopentadienyl group.

Where the compound of formula I contains two unbridged η-ligands L, it may be preferred that these be unsymmetrically substituted, with alkyl, aryl or alkaryl groups.

Particularly preferred ligands include substituted cyclopentadienyls, e.g. n-butyl-cyclopentadienyl, and 1,2 and 1,3 methyl and/or butyl substituted cyclopentadienyl. Aryl, alkaryl and trialkylsilyloxy substituted indenyl ligands are also preferred. Indenyl groups substituted with alkyl groups and/or with fused aromatic rings are also preferred, and are aza-indenyl aza-cyclopentadienyl, and aza-pentalenyl ligands.

In general, where alkyl substituents are referred to herein they will preferably contain up to 8 carbons, more preferably up to 4 carbons. Aryl groups will preferably be phenyl or naphthyl groups or 5 to 7 membered heterocyclic rings containing one or two heteroatoms.

Examples of suitable η-ligands include the following:

cyclopentadienyl, indenyl, fluorenyl, pentalenyl, indolyl, pyrrolidyl, carbazoyl, 7-cyclopentadithio-phenyl, phospholyl, benzo-1-phospholyl, 7-cyclopentadipyrrolyl, 7-cyclopentadiphospholyl, azapentalenyl, thiapentalenyl, 2-methyl-thiapentalenyl, 2-ethyl-thiapentalenyl, pentamethyl-cyclobutadienyl, methyl-cyclopentadienyl, 1,3-di-methyl-cyclopentadienyl, i-propyl-cyclopentadienyl, 1,3-di-i-propyl-cyclopentadienyl, n-butyl-cyclopentadienyl, 1,3-di-n-butyl-cyclopentadienyl, t-butyl-cyclopentadienyl, 1,3-di-t-butyl-cyclopentadienyl, trimethylsilyl-cyclopentadienyl, 1,3-di-trimethylsilyl-cyclopentadienyl, benzyl-cyclopentadienyl, 1,3-di-benzyl-cyclopentadienyl, phenyl-cyclopentadienyl, 1,3-di-phenyl-cyclopentadienyl, naphthyl-cyclopentadienyl, 1,3-di-naphthyl-cyclopentadienyl, 1-methyl-indenyl, 1,3,4-tri-methyl-cyclopentadienyl, 1-i-propyl-indenyl, 1,3,4-tri-i-propyl-cyclopentadienyl, 1-n-butyl-indenyl, 1,3,4-tri-n-butyl-cyclopentadienyl, 1-t-butyl-indenyl, 1,3,4-tri-t-butyl-cyclopentadienyl, 1-trimethylsilyl-indenyl, 1,3,4-tri-trimethylsilyl-cyclopentadienyl, 1-benzyl-indenyl, 1,3,4-tri-benzyl-cyclopentadienyl, 1-phenyl-indenyl, 1,3,4-tri-phenyl-cyclopentadienyl, 1-naphthyl-indenyl, 1,3,4-tri-naphthyl-cyclopentadienyl, 1,4-di-methyl-indenyl, 1,4-di-i-propyl-indenyl, 1,4-di-n-butyl-indenyl, 1,4-di-t-butyl-indenyl, 1,4-di-trimethylsilyl-indenyl, 1,4-di-benzyl-indenyl, 1,4-di-phenyl-indenyl, 1,4-di-naphthyl-indenyl, methyl-fluorenyl, i-propyl-fluorenyl, n-butyl-fluorenyl, t-butyl-fluorenyl, trimethylsilyl-fluorenyl, benzyl-fluorenyl, phenyl-fluorenyl, naphthyl-fluorenyl, 5,8-di-methyl-fluorenyl, 5,8-di-i-propyl-fluorenyl, 5,8-di-n-butyl-fluorenyl, 5,8-di-t-butyl-fluorenyl, 5,8-di-trimethylsilyl-fluorenyl, 5,8-di-benzyl-fluorenyl, 5,8-di-phenyl-fluorenyl, 5,8-di-naphthyl-fluorenyl, 1,3-propandiyl-bis-inden-l-yl, 1,2-ethylene-bis-(inden-l-yl), 1,2-ethylene-bis-(2-trimethylsilyloxy-inden-l-yl), dimethylsilyl-bis-(2-methyl-inden-l-yl), dimethylsilyl-bis(2-methyl-4,5-benzinden-l-yl) and dimethylsilyl-bis-inden-l-yl.

The group $NR_2$ which is bound to the metal M in the metallocene-amides of formula I is an amide and not an amine group. Each R is preferably a methyl, ethyl, isopropyl, n-propyl, n-butyl, iso-butyl, t-butyl, n-pentyl, n-hexyl or n-heptyl group, more especially R is t-butyl or more preferably methyl.

Where $NR_2$ is a cyclic amide it may for example have a $C_5N$ or $C_6N$ ring skeleton (which itself may optionally be substituted), optionally containing further ring heteroatoms, and be saturated or unsaturated. Pyrrol-l-yl, pyrrolidin-l-yl and piperidin-l-yl groups are examples. In general it may be desirable for the metal bonding amide nitrogen to be bound to an atom which is itself n-bonded.

The metallocene-amides used according to the invention may be prepared by reaction of an equivalent dihalide with an alkali metal amide (e.g. a lithium amide), preferably in molar equivalent quantities:

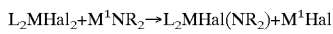

(where $M^1$ is an alkali metal and $L_2$ is used for simplicity to denote two bridged or unbridged η-ligands).

The equivalent dihalide ($L_2MHal_2$) may itself be prepared by reaction of a metal halide with a salt of the η-ligand:

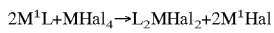

This reaction is generally preferably performed at low temperature. After the reaction, the halide by-product is preferably removed before the isomers of the metallocene are separated, e.g. into the rac and meso forms.

The metallocene dihalides can also if desired be prepared by reaction of a corresponding bis amide with a halosilane:

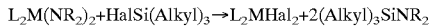

(for example using $(CH_3)_3SiCl$ as the halosilane).

The bisamide can be prepared (see U.S. Pat. No. 5,597, 935) by reaction of the η-ligand with a metal amide:

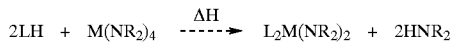

A still further and more advantageous way of preparing the metallocene-amides used in the invention is to react an η-ligand with a metal halide/amide:

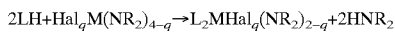

(where q is 1 or 2). Surprisingly this direct reaction yields the halogen/amide substituted metallocene or optionally the metallocene dihalide (which can then be amidated as discussed above). Where a bridged η-ligand is used then in place of 2LH one will of course use HL—R*—LH. One advantage of this process is the absence of a halide salt by-product and as a result the rac/meso separation may be effected directly. This reaction is conveniently effected at at least 100° C., preferably 160–170° C. The reaction moreover can be used for all the known η-ligands. If desired it can be used to produce mono-η-ligand metallocene-amides ("half sandwich" metallocene-amides) for use in the present invention.

Metallocene-amides where halide ligands are not present or where other X ligands are present may be prepared by conventional techniques, e.g. by reaction of the corresponding amide/halide with a Grignard reagent.

The metallocene-amides which contain a bridged bis η-ligand which is silyloxy ring-substituted are novel and form a further aspect of the invention. Viewed from this aspect the invention provides a metallocene in which the metal is η-liganded by a bridged bis η-ligand which is ring substituted by a silyloxy group and in which the metal is also liganded by an amide group which is not bound to a group which is η-liganded to the metal.

In the silyloxy-metallocene-amides of the invention, the ring systems and the bridging groups may be as described above. Preferably however the ring system is an indenyl system, especially an inden-1-yl system and especially preferably an inden-1-yl system substituted at the 3-position or more preferably the 2-position by the silyloxy group. The bridging group is preferably an 1,2-ethandiyl group and the silyloxy group is preferably a group —O—SiR$^1_3$ group where R$^1$ is as defined above, especially a trialkylsilyloxy group, e.g. dimethyl-t.butylsilyloxy.

The metal in the silyloxy-metallocene-amides of the invention may be a metal M as defined above and preferably is Zr, Hf or Ti, especially Zr. The ligands which are neither amides (which may be as described above) nor η-ligands may be halides or other X ligands as described above—chloride however is preferred.

Thus 2,2-ethandiyl bis(2-dimethyl t.butylsilyloxy-inden-1-yl)(dimethylamido)zirconium chloride is especially preferred. This may be prepared by reacting the corresponding dichloride with an alkali metal dimethylamide as discussed above. If desired, rac and meso forms may be isolated by crystallization.

The supported, heterogeneous catalysts of the invention can be used for polymerization of 1-olefins, especially $C_{2-10}$ 1-olefins, in particular ethylene and propylene. They are however especially suited for ethylene polymerization. Such polymerization may be homo- or copolymerization, e.g with one or more further 1-olefin monomers, but also optionally with other copolymerizable monomers, e.g. mono- or multiply ethylenically unsaturated $C_{2-20}$ comonomers, e.g. dienes such as butadiene or norbornadiene or cycloolefins such as bridged cyclohexenes. Where a comonomer is used this will generally provide up to 40% by weight of the copolymer product.

Such polymerization reactions may be effected in the liquid, slurry or gas phase, e.g. using conventional gas phase reactors, slurry reactors, loop reactors, or kettle reactors, optionally using hydrogen as a means for molecular weight control and optionally using non-polymerizable hydrocarbons (e.g. alkanes, such as i-butane or propane) as diluents/solvents.

Particularly preferably, the polymerization is effected in a series of reactors, especially one or more slurry loop reactors followed by one or more gas phase reactors, e.g. as described in WO 92/12182.

Viewed from a further aspect the invention provides a process for the preparation of a heterogeneous olefin-polymerization catalyst, said process comprising (1) obtaining a porous particulate support material;
(2) optionally heat treating said support material;
(3) optionally alkylating said support material;
(4) contacting said support material with a metallocene-amide or the reaction product thereof with a co-catalyst (e.g. an aluminoxane);
(5) optionally removing solvent from the resulting impregnated support material;
(6) optionally contacting said support material with a further olefin polymerization catalyst, said metallocene-amide and/or a co-catalyst and optionally removing solvent from the resulting impregnated support material; and
(7) optionally impregnating said support material with a cross-linking agent or a surface modifier.

Viewed from a still further aspect the invention provides the use of the heterogeneous olefin polymerization catalyst according to the invention in the homo- or copolymerization of olefins, especially $C_{2-10}$ 1-olefins, more especially ethylene.

Viewed from a yet further aspect the invention provides a process for the homo or copolymerization of an olefin comprising contacting an olefin monomer with a supported metallocene catalyst, characterised in that as said supported metallocene catalyst is used a heterogeneous olefin polymerization catalyst according to the invention.

Where the heterogeneous catalyst of the invention does not contain a co-catalyst, a co-catalyst (e.g. an aluminoxane or a boron compound) will preferably be used with it, optionally also impregnated into a porous particulate support.

By way of example, ethylene may be polymerized using the supported metallocene-amides of the invention as follows: ethylene is polymerized in the presence of the catalyst at an elevated temperature and pressure. Polymerization is carried out in a series of polymerization reactors selected from the group of slurry and gas phase reactors. A loop reactor is a particularly preferred embodiment of polymerization in slurry reactors. Where the polymer product is to be bimodal, the relatively high molar mass portion and the relatively low molar mass portion of the product can be prepared in any order in the reactors.

In the following the reactor system will be described with particular reference to a system akin to the one disclosed in EP-B-517868 (WO92/12182) and comprising one loop reactor (referred to as "the first reactor") and one gas phase reactor (referred to as "the second reactor"), in that order. However, it should be understood that the reactor system can comprise the reactors in any number and order.

In every polymerization step it is possible to use also comonomers selected from the group of $C_{2-12}$ olefins, preferably $C_{4-10}$ olefins, such as 1-butene, 1-pentene, 1-hexene, 4-methyl-1-pentene, 1-heptene, 1-octene, 1-nonene and 1-decene as well as mixtures thereof. The use of comonomers is particularly preferred for the preparation of a high molar mass portion. The amount of comonomers is generally 0 to 10 wt-% depending on the desired density for the product. The low molecular weight component generally contains less than about 3 wt-%.

In addition to the actual polymerization reactors used for producing a bimodal ethylene homo- or copolymer, the polymerization reaction system can also include a number of additional reactors, such as prereactors. The prereactors include any reactor for prepolymerizing the catalyst and for modifying the olefinic feed, if necessary. All reactors of the reactor system are preferably arranged in series (in a cascade).

Accordingly, the polymerization may comprise the steps of

- subjecting ethylene, optionally hydrogen and/or comonomers to a first polymerization reaction in a first reaction zone or reactor,
- recovering the first polymerization product from the first reaction zone,
- feeding the first polymerization product to a second reaction zone or reactor,
- feeding additional ethylene and optionally hydrogen and/or comonomers to the second reaction zone,
- subjecting the additional ethylene and optional hydrogen and/or comonomer to a second polymerization reaction in the presence of the first polymerization product to produce a second polymerization product, and
- recovering the second polymerization product from the second reaction zone.

Thus, in the first step of the process, ethylene with the optional comonomer(s) together with the catalyst is fed into the first polymerization reactor. Along with these components hydrogen as a molar mass regulator is fed into the reactor in the amount required for achieving the desired molar mass of the polymer. Alternatively, the feed of the first reactor can consist of the reaction mixture from a previous reactor, if any, together with added fresh monomer, optional hydrogen and/or comonomer and cocatalyst. In the presence of the catalyst, ethylene and the optional comonomer will polymerize and form a product in particulate form, i.e. polymer particles, which are suspended in the fluid circulated in the reactor.

The polymerization medium typically comprises the monomer (i.e. ethylene) and/or a hydrocarbon, and the fluid is either liquid or gaseous. In the case of a slurry reactor, in particular a loop reactor, the fluid can be a liquid or a so called supercritical fluid where the temperature and pressure in the reactor are higher than the critical temperature and pressure of the fluid. The polymer is circulated continuously through the slurry reactor by means of an agitator, or in the case on a loop reactor, by means of a circulation pump.

The slurry polymerization is generally conducted in an inert hydrocarbon diluent. Preferably, a light hydrocarbon, such as propane, isobutane, n-butane or isopentane, is used as a diluent. In particular propane is used, since this allows for operation at supercritical conditions at a relatively low temperature.

The conditions of the slurry reactor are generally selected so that at least 20 wt-%, preferably at least 35 wt-%, of the whole production is polymerized in the slurry reactor(s). The temperature is in the range of 40 to 110° C., preferably in the range of 70 to 100° C. The reaction pressure is in the range of 25 to 100 bar, preferably 35 to 80 bar. In order to produce a polyethylene having a density in excess of 960 kg/m$^3$, the polymerization is preferably carried out at supercritical conditions at temperatures over 90° C., preferably 95–100° C.

In slurry polymerization more than one reactor can be used in series. In such a case the polymer suspension in an inert hydrocarbon produced in the slurry reactor is fed without separation of inert components and monomers periodically or continuously to the following slurry reactor, which is at lower pressure than the previous slurry reactor.

The polymerisation heat is removed by cooling the reactor with a cooling jacket. The residence time in the slurry reactor must generally be at least 10 minutes, preferably 20–100 min for obtaining a sufficient degree of polymerization.

As discussed above, if a low molar mass polyethylene is the desired product, hydrogen is fed into the reactor. Hydrogen can be added to the reactor at ratio of 0 to 100 mol H$_2$/kmol ethylene, preferably 0–20, more preferably 0–10 mol H$_2$/kmol ethylene, e.g. 1–10 mol H$_2$/kmol ethylene. Comonomer can be added so that the ratio of comonomer to ethylene is at the most 200 mol/kmol. If the high molecular weight component is to be produced in the loop reactor, then hydrogen and comonomer are fed into the reactor. Hydrogen is fed so that the amount of hydrogen is low compared to ethylene, the ratio between hydrogen and ethylene being less than 5 mol/kmol, preferably less than 2 mol/kmol. Comonomer is fed so that the ratio between comonomer and ethylene is less than 200 mol/kmol, preferably less than 100 mol/kmol.

The pressure of the first polymerization product including the reaction medium is reduced after the first reaction zone in order to evaporate volatile components of the product, e.g. in a flash tank. As a result of the flashing, the product stream containing the polyethylene is freed from hydrogen and can be subjected to a second polymerization in the presence of additional ethylene to produce a high molar mass polymer.

The second reactor is preferably a gas phase reactor, wherein ethylene and preferably comonomers are polymerized in a gaseous reaction medium.

The gas phase reactor can be an ordinary fluidized bed reactor, although other types of gas phase reactors can be used. In a fluidized bed reactor, the bed consists of the formed and growing polymer particles as well as still active catalyst which comes along with the polymer fraction. The bed is kept in a fluidized state by introducing gaseous components, for instance monomer at flow rate which will make the particles act as a fluid. The fluidizing gas can also contain inert carrier gases, like nitrogen and propane and also hydrogen as a modifier. The fluidized gas phase reactor can be equipped with a mechanical mixer.

If the high molecular weight component is to be produced in the gas phase reactor, hydrogen is added into the reactor so that the ratio between hydrogen and ethylene is less than 10 mol/kmol, preferably less than 5 mol/kmol. Comonomer is fed in a sufficient amount so as to achieve a ratio between comonomer and ethylene of less than 200 mol/kmol, preferably less than, 100 mol/kmol.

If the low molecular weight polymer is produced in the gas phase reactor hydrogen is added into the reaction so that the ratio of hydrogen to ethylene is between 0 and 100 mol/kmol, preferably 0–20, more preferably 0–10, e.g. 1–10 mol/kmol. Comonomer may be added so that its ratio to ethylene is lower than 30 mol/kmol. Preferably no comonomer is used.

The polymerization can also be carried out without a slurry reactor in two or more cascaded gas phase reactors. Either a high molecular weight component or a low molecular weight component can be produced in the first reactor.

The gas phase reactor used can be operated in the temperature range of 50 to 115° C., preferably between 60 and 110° C. The reaction pressure is typically between 10 and 40 bar and the partial pressure of monomer between 1 and 20 bar.

The pressure of the second polymerization product including the gaseous reaction medium can then be released after the second reactor in order optionally to separate part of the gaseous and possible volatile components of the product, e.g. in a flash tank. The overhead stream or part of it is recirculated to the second reactor.

If a bimodal polymer product is to be produced in this way, the production split between the relatively high and relatively low molar mass polymerization reactors will generally be 5–95:95–5. Preferably, 5 to 50%, in particular 10 to 50%, of the ethylene homopolymer or copolymer is produced at conditions to provide a polymer having a $MFR_2$ of 500 g/10 min or more and constituting the low molar mass portion of the polymer, and 95 to 50%, in particular 90 to 50%, of the ethylene homopolymer or preferably copolymer is produced at such conditions that the desired MFR and density are attained.

By using a multistage polymerization procedure like this, it is possible to produce bimodal (and multimodal) polymers, to improve comonomer incorporation, and to improve molecular weight distribution (MWD) so as to give improved polymer processability, melt strength, optical properties and a better balance of mechanical properties.

All publications referred to herein are hereby incorporated by reference.

The invention will now be described further with reference to the following non-limiting Examples.

EXAMPLE 1

Use of [$\eta^5$:$\eta^5$-bis(n-Butylcyclopentadienyl)] (dimethylamido)zirconium Chloride

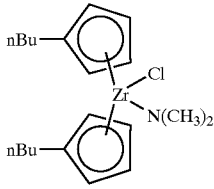

Metallocene Preparation

Under an inert gas atmosphere, 14.834 g (36.67 mmol) bis(n-butylcyclopentadienyl)zirconium dichloride and 1.871 g (36.67 mmol) dimethylamido lithium are introduced into 100 mL toluene. The mixture is refluxed for 3 hours, cooled to ambient temperature and filtered. The solvent is distilled off under high vacuum leaving the title compound as a brown oily substance.

$^1$H NMR (200 MHz, $C_6D_6$, 25° C.) δ (ppm): 0.86 (t, 6H, $CH_2$—C$\underline{H}_3$), 1.18–1.55 (m, 8H, C$\underline{H}_2$), 2.39–2.69 (m, 4H, C$\underline{H}_2$), 2.86 (s, 6H, N(C$\underline{H}_3$)$_2$), 5.49–5.52 (m, 2H, 5-Ring), 5.57–5.62 (m, 2H, 5-Ring), 5.85–5.90 (m, 2H, 5-Ring), 5.99–6.02 (m, 2H, 5-Ring). $^{13}$C NMR (50 MHz, $C_6D_6$, 25° C.) δ (ppm): 14.12 $CH_2$—$\underline{C}H_3$), 22.80/30.12/33.53 (—$\underline{C}H_2$—), 50.45 (N($\underline{C}H_3$)$_2$), 107.66/110.04/111.74/114.54/131.79 (5-Ring).

Catalyst Preparation
Carrier Calcination
Sylopol 55SJ silica was calcinated under nitrogen for 10 hours at 600° C.
Impregnation of Metallocene
14.3 mg of (n-Bu-Cp)$_2$ZrCl(N(CH$_3$)$_2$) was dissolved into 3.1 ml 30 wt % MAO. 1.24 ml of this solution was taken and 0.3 ml toluene was added. This 1.5 ml solution was added to 1.0094 g of the previously prepared silica carrier in a septum bottle. The catalyst was dried in a fume cupbaord under a nitrogen flow at 30° C. for one hour. The catalyst has a Zr content of 0.1 wt % and Al/Zr (molar ratio)=400.

Ethylene Homopolymerization
Polymerization was carried out in a 2-liter Buchi autoclave in i-butane. The ethylene partial pressure was 5 bar, the temperature was 80° C. 227 mg of the catalyst was fed to the autoclave. After 1 hour of polymerization, the yield of polyethylene was 93.4 g, giving a catalyst activity of 0.4 kg PE/g cat h.
Polymer Properties
Mw/Mn=2.5, Mw 138000, BD (bulk density): 350 g/cm$^3$
Ethylene Copolymerization
Polymerization was carried out in a 2-liter Buchi autoclave in i-butane. The ethylene partial pressure was 5 bar, the 1-hexane content 30 ml, and the temperature was 80° C. 141 mg of the catalyst was fed to the autoclave. After 1 hour of polymerization, the yield of polyethylene was 306 g, giving a catalyst activity of 2.2 kg PE/g cat h.
Polymer Properties
Mw/Mn 2.6, Mw 124000, BD: 440 g/cm$^3$.

EXAMPLE 2

Use of [$\eta^5$:$\eta^5$-bis(n-Butylcyclopentadienyl)] (dimethylamido)zirconium Chloride Catalyst Preparation
Carrier Calcination
Sylopol 55SJ silica was calcinated under nitrogen for 10 hours at 600° C.
Impregnation of Metallocene
22.8 mg of (n-Bu-Cp)$_2$ZrCl(N(CH$_3$)$_2$) (prepared as in Example 1) was dissolved into 2.5 ml 30 wt % MAO. 1.24 ml of this solution was taken and 0.3 ml toluene was added. This 1.5 ml solution was added to 1.0043 g of the previously prepared silica carrier in a septum bottle. The catalyst was dried in a fume cupboard under a nitrogen flow at 30° C. for one hour. The catalyst has a Zr content of 0.2 wt % and Al/Zr=200.

Ethylene Homopolymerization

Polymerization was carried out in a 2-liter Buchi autoclave in i-butane. The ethylene partial pressure was 5 bar, the temperature was 80° C. 215 mg of the catalyst was fed to the autoclave. After 1 hour of polymerization, the yield of polyethylene was 195 g, giving a catalyst activity of 0.9 kg PE/g cat h.
Polymer Properties
Mw/Mn=2.4, Mw 104000, BD: 370 g/cm$^3$ Ethylene Copolymerization Polymerization was carried out in a 2-liter Buchi autoclave in i-butane. The ethylene partial pressure was 5 bar, the 1-hexene content 30 ml, and the temperature was 80° C. 125 mg of the catalyst was fed to the autoclave. After 1 hour of polymerization, the yield of polyethylene was 537 g, giving a catalyst activity of 4.3 kg PE/g cat h.
Polymer Properties
Mw/Mn=2.2, Mw 89200, BD: 380 g/cm$^3$.

EXAMPLE 3

Use of [$\eta^5$:$\eta^5$-bis(n-Butylcyclopentadienyl)] (dimethylamido)zirconium Chloride Catalyst Preparation
Carrier Calcination
Sylopol 55SJ silica was calcinated under nitrogen for 10 hours at 600° C.
Impregnation of Metallocene
54.8 mg of (n-Bu-Cp)$_2$ZrCl(N(CH$_3$)$_2$) (prepared as in Example 1) was dissolved into 3.2 ml 30 wt % MAO. 1.24 ml of this solution was taken and 0.3 ml toluene was added. This 1.5 ml solution was added to 1.0128 g of the previously prepared silica carrier in a septum bottle. The catalyst was dried in a fume cupboard under a nitrogen flow at 30° C. for one hour. The catalyst has a Zr content of 0.4 wt % and Al/Zr=100.

Ethylene Homopolymerization

Polymerization was carried out in a 2-liter Buchi autoclave in i-butane. The ethylene partial pressure was 5 bar, the temperature was 80° C. 200 mg of the catalyst was fed to the autoclave. After 1 hour of polymerization, the yield of polyethylene was 187 g, giving a catalyst activity of 0.93 kg PE/g cat h.
Polymer Properties
Mw/Mn=2.6, Mw 124000, BD: 310 g/cm$^3$ Ethylene Copolymerization Polymerization was carried out in a 2-liter Buchi autoclave in i-butane. The ethylene partial pressure was 5 bar, the 1-hexene content 30 ml, and the temperature was 80° C. 129 mg of the catalyst was fed to the autoclave. After 1 hour of polymerization, the yield of polyethylene was 546 g, giving a catalyst activity of 4.2 kg PE/g cat h.
Polymer Properties
Mw/Mn=2.2, Mw 88600, BD: 390 g/cm$^3$.

EXAMPLE 4

Use of [$\eta^5$:$\eta^5$-bis(n-Butylcyclopentadienyl)] (dimethylamido)zirconium Chloride Catalyst Preparation
Carrier Calcination
Sylopol 55SJ silica was calcinated under nitrogen for 10 hours at 600° C.
Impregnation of Metallocene
90.6 mg of (n-Bu-Cp)$_2$ZrCl(N(CH$_3$)$_2$) (prepared as in Example 1) was dissolved into 2.5 ml 30 wt % MAO. 1.24 ml of this solution was taken and 0.3 ml toluene was added. This 1.5 ml solution was added to 1.0094 g of the previously prepared silica carrier in a septum bottle. The catalyst was dried in a fume cupboard under a nitrogen flow at 30° C. for one hour. The catalyst has a Zr content of 0.8 wt % and Al/Zr=50.

Ethylene Homopolymerization

Polymerization was carried out in a 2-liter Buchi autoclave in i-butane. The ethylene partial pressure was 5 bar, the temperature was 80° C. 200 mg of the catalyst was fed to the autoclave. After 1 hour of polymerization, the yield of polyethylene was 240 g, giving a catalyst activity of 1.2 kg PE/g cat h.
Polymer Properties
Mw/Mn=2.5, Mw 104000, BD: 330 g/cm$^3$ Ethylene Copolymerization Polymerization was carried out in a 2-liter Buchi autoclave in i-butane. The ethylene partial pressure was 5 bar, the 1-hexene content 30 ml, and the temperature was 80° C. 138 mg of the catalyst was fed to the autoclave. After 1 hour of polymerization, the yield of polyethylene was 306 g, giving a catalyst activity of 4.1 kg PE/g cat h.
Polymer Properties
Mw/Mn=2.1, Mw 87700, BD: 360 g/cm$^3$.

EXAMPLE 5 (COMPARATIVE)

Use of (n-Bu-Cp)$_2$ZrCl$_2$

Catalyst Preparation
Carrier Calcination
Sylopol 55SJ silica was calcinated under nitrogen for 10 hours at 600° C.
Impregnation of Metallocene
22.4 mg of (n-Bu-Cp)$_2$ZrCl$_2$ was dissolved into 2.5 ml 30 wt % MAO. 1.24 ml of this solution was taken and 0.3 ml toluene was added. This 1.5 ml solution was added to 1.0094 g of the previously prepared silica carrier in a septum bottle. The catalyst was dried in a fume cupboard under a nitrogen flow at 30° C. for one hour. The catalyst has a Zr content of 0.2 wt % and Al/Zr=200.

Ethylene Homopolymerization

Polymerization was carried out in a 2-liter Buchi autoclave in i-butane. The ethylene partial pressure was 5 bar, the temperature was 80° C. 268 mg of the catalyst was fed to the autoclave. After 1 hour of polymerization, the yield of polyethylene was 171 g, giving a catalyst activity of 0.64 kg PE/g cat h.
Polymer Properties
Mw/Mn=2.5, Mw 114000, BD: 370 g/cm$^3$ Ethylene Copolymerization Polymerization was carried out in a 2-liter Buchi autoclave in i-butane. The ethylene partial pressure was 5 bar, the 1-hexene content 30 ml, and the temperature was 80° C. 176 mg of the catalyst was fed to the autoclave. After 1 hour of polymerization, the yield of polyethylene was 480 g, giving a catalyst activity of 2.7 kg PE/g cat h.
Polymer Properties
Mw/Mn=2.3, Mw 86300, BD: 420 g/cm$^3$.

As may be seen by comparison with the catalyst of Example 2 which also has a Zr content of 0.2 wt % and an Al/Zr ratio of 200, the comparative catalyst of Example 18 displays much lower catalyst activities.

EXAMPLE 6

Use of [$\eta^5$:$\eta^5$-bis-n-Butylcyclopentadienyl] (dimethylamido)hafnium Chloride

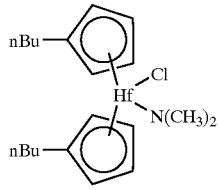

Metallocene Preparation

Under an inert gas atmosphere, log (20.33 mmol) bis(n-butylcyclopentadienyl)hafnium dichloride and 1.04 g (20.33 mmol) dimethylamido lithium are introduced into 100 mL toluene. The mixture is refluxed for 3 hours, cooled to ambient temperature and filtered. The solvent is distilled off under high vacuum leaving the title compound as a brown oily substance.
$^1$H NMR (200 MHz, C$_6$D$_6$, 25° C.) δ (ppm): 0.86 (t, 6H, CH$_2$—C$\underline{H}_3$), 1.17–1.53 (m, 8H, C$\underline{H}_2$), 2.36–2.71 (m, 4H, C$\underline{H}_2$), 2.92 (s, 6H, N(C$\underline{H}_3$)$_2$), 5.46–5.50 (m, 2H, 5-Ring), 5.53–5.57 (m, 2H, 5-Ring), 5.83–5.88 (m, 2H, 5-Ring), 5.91–5.94 (m, 2H, 5-Ring).

Catalyst Preparation
Carrier Calcination
Sylopol 55SJ silica was calcinated under nitrogen for 10 hours at 600° C.
Impregnation of Metallocene
13.9 mg of (n-BuCp)$_2$HfCl(N(CH$_3$)$_2$) was dissolved into 2.48 ml 30 wt % MAO. 1.22 ml of this solution was taken and 0.3 ml toluene was added. This 1.5 ml solution was added to 1.0921 g of the previously prepared silica carrier in a septum bottle. The catalyst was dried in a fume cupboard under a nitrogen flow at 30° C. for one hour. The catalyst has a Hf content of 0.1 wt % and Al/Hf=400.

Ethylene Homopolymerization

Polymerization was carried out in a 2-liter Buchi autoclave in i-butane. The ethylene partial pressure was 5 bar, the temperature was 80° C. 241 mg of the catalyst was fed to the autoclave. After 1 hour of polymerization, the yield of polyethylene was 65 g, giving a catalyst activity of 0.27 kg PE/g cat h.
Polymer Properties
BD: 360 g/cm$^3$.

Ethylene Copolymerization

Polymerization was carried out in a 2-liter Buchi autoclave in i-butane. The ethylene partial pressure was 5 bar, the 1-hexene content 30 ml, and the temperature was 80° C. 197 mg of the catalyst was fed to the autoclave. After 1 hour of polymerization, the yield of polyethylene was 242 g, giving a catalyst activity of 1.23 kg PE/g cat h.
Polymer Properties
BD: 390 g/cm$^3$.

EXAMPLE 7

Use of [$\eta^5$:$\eta^5$-bis-n-Butylcyclopentadienyl] (dimethylamido)hafnium Chloride Catalyst Preparation
Carrier Calcination
Sylopol 55SJ silica was calcinated under nitrogen for 10 hours at 600° C.
Impregnation of Metallocene
20.6 mg of (n-BuCp)$_2$HfCl(N(CH$_3$)$_2$) (prepared as in Example 6) was dissolved into 1.83 ml 30 wt % MAO. 1.22 ml of this solution was taken and 0.3 ml toluene was added. This 1.5 ml solution was added to 1.0401 g of the previously prepared silica carrier in a septum bottle. The catalyst was dried in a fume cupboard under a nitrogen flow at 30° C. for one hour. The catalyst has a Hf content of 0.2 wt % and Al/Hf=200.

Ethylene Homopolymerization

Polymerization was carried out in a 2-liter Buchi autoclave in i-butane. The ethylene partial pressure was 5 bar, the 1-hexene content 30 ml, and the temperature was 80° C. 218 mg of the catalyst was fed to the autoclave. After 1 hour of polymerization, the yield of polyethylene was 66 g, giving a catalyst activity of 0.30 kg PE/g cat h.
Polymer Properties
BD: 340 g/cm$^3$.

Ethylene Copolymerization

Polymerization was carried out in a 2-liter Buchi autoclave in i-butane. The ethylene partial pressure was 5 bar, the 1-hexene content 30 ml, and the temperature was 80° C. 173 mg of the catalyst was fed to the autoclave. After 1 hour of polymerization, the yield of polyethylene was 198 g, giving a catalyst activity of 1.14 kg PE/g cat h.
Polymer Properties
BD: 380 g/cm$^3$.

EXAMPLE 8

Use of [$\eta^5$:$\eta^5$-bis-n-Butylcyclopentadienyl] (dimethylamido)hafnium Chloride Catalyst Preparation
Carrier Calcination
Sylopol 55SJ silica was calcinated under nitrogen for 10 hours at 600° C.
Impregnation of Metallocene
27.4 mg of (n-BuCp)$_2$HfCl(N(CH$_3$)$_2$) (prepared as in Example 6) was dissolved into 1.22 ml of 30 wt % MAO and 0.3 ml toluene was added. This 1.5 ml solution was added to 1.1095 g of the previously prepared silica carrier in a septum bottle. The catalyst was dried in a fume cupboard under a nitrogen flow at 30° C. for one hour. The catalyst has a Hf content of 0.4 wt % and Al/Hf=100.

Ethylene Homopolymerization

Polymerization was carried out in a 2-liter Buchi autoclave in i-butane. The ethylene partial pressure was 5 bar, the 1-hexene content 30 ml, and the temperature was 80° C. 240 mg of the catalyst was fed to the autoclave. After 1 hour of polymerization, the yield of polyethylene was 74 g, giving a catalyst activity of 0.31 kg PE/g cat h.
Polymer Properties
BD: 330 g/cm$^3$.

Ethylene Copolymerization

Polymerization was carried out in a 2-liter Buchi autoclave in i-butane. The ethylene partial pressure was 5 bar, the 1-hexene content 30 ml, and the temperature was 80° C. 196 mg of the catalyst was fed to the autoclave. After 1 hour of polymerization, the yield of polyethylene was 194 g, giving a catalyst activity of 0.99 kg PE/g cat h.
Polymer Properties
BD: 410 g/cm$^3$.

EXAMPLE 9

Use of [$\eta^5$:$\eta^5$-bis-n-Butylcyclopentadienyl] (dimethylamido)hafnium Chloride Catalyst Preparation
Carrier Calcination
Sylopol 55SJ silica was calcinated under nitrogen for 10 hours at 600° C.
Impregnation of Metallocene
59.9 mg of (n-BuCp)$_2$HfCl(N(CH$_3$)$_2$) (prepared as in Example 6) was dissolved into 1.33 ml 30 wt % MAO. 1.33 ml of this solution was taken and 0.3 ml toluene was added. This 1.5 ml solution was added to 1.0481 g of the previously prepared silica carrier in a septum bottle. The catalyst was dried in a fume cupboard under a nitrogen flow at 30° C. for one hour. The catalyst has a Hf content of 0.8 wt % and Al/Hf=50.

Ethylene Homopolymerization

Polymerization was carried out in a 2-liter Buchi autoclave in i-butane. The ethylene partial pressure was 5 bar, the 1-hexene content 30 ml, and the temperature was 80° C. 240 mg of the catalyst was fed to the autoclave. After 1 hour of polymerization, the yield of polyethylene was 13.7 g, giving a catalyst activity of 0.06 kg PE/g cat h.

Ethylene Copolymerization

Polymerization was carried out in a 2-liter Buchi autoclave in i-butane. The ethylene partial pressure was 5 bar, the 1-hexene content 30 ml, and the temperature was 80° C. 186 mg of the catalyst was fed to the autoclave. After 1 hour of polymerization, the yield of polyethylene was 53.2 g, giving a catalyst activity of 0.29 kg PE/g cat h.

EXAMPLE 10

Use of [$\eta^5$:$\eta^5$-bis-n-Butylcyclopentadienyl](dimethylamido)hafnium Chloride

Catalyst Preparation

Carrier Calcination

Sylopol 55SJ silica was calcinated under nitrogen for 10 hours at 600° C.

Impregnation of Metallocene 19.9 mg of (n-BuCp)$_2$HfCl(N(CH$_3$)$_2$) (prepared as in Example 6) was dissolved into 3.5 ml of 30 wt % MAO and 1.2 ml of toluene was added. 3.0 ml of this solution was added to 2.192 g of the previously prepared silica carrier in a septum bottle. The catalyst was dried in a fume cupboard under a nitrogen flow at 30° C. for one hour. The catalyst has an Hf content of 0.1 wt % and Al/Hf=400.

Ethylene Homopolymerization

Polymerization was carried out in a 5-liter Buchi autoclave in i-butane. The ethylene partial pressure 6.4 bar, total pressure 19.5 bar, H$_2$/C$_2$=4.64 mol/kmol, C$_6$/C$_2$=0 mol/kmol. The temperature was 80° C. 623 mg of the catalyst was fed to the autoclave. After 56 minutes of polymerization, i-butane, ethylene and hydrogen were flashed out. Estimated yield from ethylene consumption was 265 g.

Ethylene Copolymerization

The polymerization was continued in gas phase with an ethylene partial pressure of 10–11 bar, total pressure 19.5 bar, H$_2$/C$_2$=0 mol/kmol, C$_6$/C$_2$=55.6 mol/kmol. The temperature was 80° C. After 1 hour and 16 minutes of polymerization, the yield of polyethylene was 552 g, giving a catalyst productivity of 0.9 kg PE/g cat. Split between 1st and 2nd stages was 48/52.

| Polymer properties | |
|---|---|
| BD = | 333 kg/m$^3$ |
| MFR$_2$ = | 0.5 |
| MFR$_{21}$ = | 24.9 |
| FRR$_{21/2}$ = | 48.8 |
| density = | 935.7 |
| 1-hexene = | 6.2 wt % |

EXAMPLE 11 (COMPARATIVE)

Use of (n-Bu-Cp)$_2$HfCl$_2$

Catalyst Preparation

Carrier Calcination

Sylopol 55SJ silica was calcinated under nitrogen for 10 hours at 600° C.

Impregnation of Metallocene 13.5 mg of (n-BuCp)$_2$HfCl$_2$ was dissolved into 1.22 ml 30 wt % MAO. 1.22 ml of this solution was taken and 0.3 ml toluene was added. This 1.5 ml solution was added to 1.0 g of the previously prepared silica carrier in a septum bottle. The catalyst was dried in a fume cupboard under a nitrogen flow at 30° C. for one hour. The catalyst has a Hf content of 0.2 wt % and Al/Hf=200.

Ethylene Homopolymerization

Polymerization was carried out in a 2-liter Buchi autoclave in i-butane. The ethylene partial pressure was 5 bar, the 1-hexene content 30 ml, and the temperature was 80° C. 246 mg of the catalyst was fed to the autoclave. After 1 hour of polymerization, the yield of polyethylene was 82 g, giving a catalyst activity of 0.33 kg PE/g cat h.

Polymer Properties

BD: 370 g/cm$^3$.

Ethylene Copolymerization

Polymerization was carried out in a 2-liter Buchi autoclave in i-butane. The ethylene partial pressure was 5 bar, the 1-hexene content 30 ml, and the temperature was 80° C. 169 mg of the catalyst was fed to the autoclave. After 1 hour of polymerization, the yield of polyethylene was 152 g, giving a catalyst activity of 0.9 kg PE/g cat h.

As can be seen, by comparison with Example 7 where the Hf content and Al:Hf ratios are the same, the catalyst activity for copolymerization is significantly higher for the metallocene-amide catalyst.

EXAMPLE 12

Use of (Tetramethyl-tertbutylamidodimethylsilyl-cyclopentadienyl)(dimethylamido)titanium (IV) Chloride

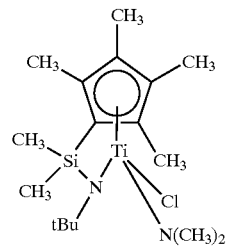

Metallocene Preparation (A) Preparation of (Tetramethyl-tertbutylamidodimethylsilyl-cyclopentadienyl) titanium (IV) Dichloride

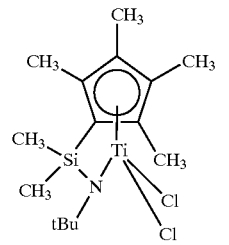

Under an inert gas atmosphere, 283 mg (1.368 mmol) of TiCl$_2$(NMe$_2$)$_2$ is introduced and dissolved in 15 mL mesitylene. The solution is contacted at ambient temperature with 344 mg (1.368 mmol) of tetramethyl-(t-butylaminodimethylsilyl)-cyclopentadiene. The resulting solution is heated under reflux at 165° C. for 114 hours. The solvent is distilled off under reduced pressure and the residue is extracted with hexane. The title product is cystallized out.

$^1$H NMR (400 MHz, CDCl$_3$, 25° C.) δ (ppm): 0.69 ((CH$_3$)$_2$Si, 6H), 1.42 (t-Bu, 9H), 2.12 (CH$_3$, 6H), 2.22 (CH$_3$, 6H). $^{13}$C NMR (100 MHz, CDCl$_3$, 25° C.) δ (ppm): 5.5, 13.1, 17.3, 32.6, 62.3, 126.9, 138.1, 140.9.

(B) Preparation of (Tetramethyl-tertbutylamidodimethylsilyl-cyclopentadienyl)(dimethylamido)titanium (IV) Chloride Under an inert gas atmosphere at ambient temperature, 190 mg (0.516 mmol) of (tetramethyl-tertbutylamido-dimethylsilyl-cyclopentadienyl)titanium (IV) dichloride of above and 26 mg (0.510 mmol) of lithium-dimethylamide are dissolved in 20 mL hexane. The mixture is stirred at ambient temperature for 30 minutes then heated under reflux for 1½ hours. After the solution is filtered the solvent is partially removed by distillation under reduced pressure and the title compound is crystallized out at −30° C. The title compound separates out as a red crystalline solid.

$^1$H NMR (400 MHz, CDCl$_3$ 25° C.) δ (ppm): 0.50 ((CH$_3$)$_2$Si, 3H) 0.56 ((CH$_3$)$_2$Si, 3H), 1.39 (t-Bu, 9H), 1.63 (CH$_3$, 3H), 1.94 (CH$_3$, 3H), 2.12 (CH$_3$, 6H), 2.80 (N(CH$_3$)$_2$, 6H)

Catalyst Preparation and Ethylene Homo and Copolymerization

Catalyst preparation and olefin polymerization are carried out as in Example 1.

EXAMPLE 13

Use of (Tetramethyl-tertbutylaminodimethylsilyl-cyclopentadienyl)bis(dimethylamido)titanium (IV) Chloride

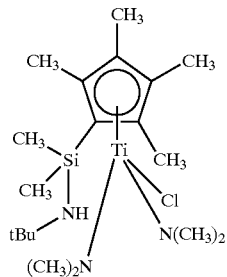

Metallocene Preparation

Under an inert gas atmosphere, 408 mg (1.893 mmol) of chlorotris(dimethylamido)titanium (IV) is introduced and dissolved in 20 mL mesitylene. This solution is contacted at ambient temperature with 476 mg (1.893 mmol) of tetramethylcyclopentadienyldimethylsilyl-tert-butylamine. The solution is then heated under reflux (111° C.) for 1¼ hours. The solution is filtered and the solvent removed by distillation under reduced pressure. The pure title compound settles out.

$^1$H NMR (400 MHz, CDCl$_3$ 25° C.) δ (ppm): 0.9 ((CH3)$_2$Si, 6H) 1.08 (t-Bu, 9H), 1.83 (CH$_3$, 6H), 2.0 (CH$_3$, 6H), 3.03 (N(CH$_3$)$_2$, 12H).

Catalyst Preparation and Ethylene Homo and Copolymerization

Catalyst preparation and olefin polymerization are carried out as in Example 1.

EXAMPLE 14

Use of Rac-[η$^5$:η$^5$ bis(1-Indenyl)dimethylsilyl](dimethylamido)zirconium Chloride

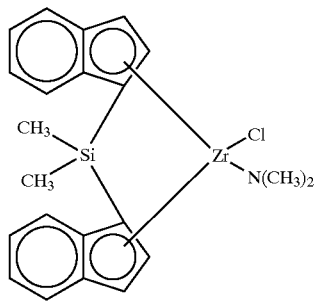

Metallocene Preparation

Under an inert gas atmosphere and at ambient temperature, 184 mg (0.711 mmol) chlorotrisdimethylamido zirconium and 205 mg (0.711 mmol) bis inden-1-yl dimethylsilane are dissolved in 20 mL mesitylene. The solution is warmed on an oil bath up to the boiling point of the solvent and refluxed for 2.5 hours. The heating of the oil bath is stopped and the solvent is distilled off under a reduced pressure of 8×10$^{-4}$ Pa. The oil bath temperature drops during this operation and if required the reaction solution temperature may be raised using a hot water bath. The residue is extracted with 30 mL toluene and the solution is concentrated down at ambient temperature. The solution is then slowly cooled to −30° C. and the title compound is isolated as a red crystalline solid.

$^1$H NMR (400 MHz, C$_6$D$_6$, 25° C.) δ (ppm): 0.82, 0.94 ((CH$_3$)$_2$Si, 6H) 2.51 (N(CH$_3$)$_2$, 6H); 6.04–7.68 (12H). $^{13}$C NMR (100 MHz, C$_6$D$_6$, 25° C.) δ (ppm): −2.30, −1.15 ((CH$_3$)$_2$Si), 48.21 (N(CH$_3$)$_2$), 111–135 (aromatic carbons).

Catalyst Preparation and Ethylene Homo and Copolymerization

Catalyst preparation and olefin polymerization are carried out as in Example 1.

EXAMPLE 15

Use of Rac [η$^5$:η$^5$ bis(1-Indenyl)dimethylsilyl](dimethylamido)hafnium Chloride

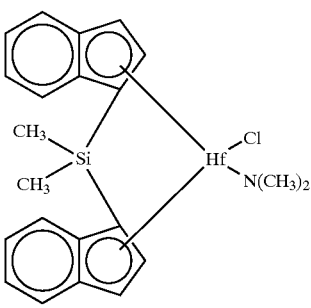

Metallocene Preparation

Under an inert gas atmosphere and at ambient temperature, 312 mg (0.901 mmol) chlorotrisdimethylamido hafnium and 260 mg (0.901 mmol) bis inden-1-yl dimethylsilane are dissolved in 25 mL mesitylene. The solution is warmed on an oil bath up to the boiling point of the solvent and refluxed for 2.5 hours. The heating of the oil bath is stopped and the solvent is distilled off under a reduced pressure of 8×10$^{-4}$ Pa. The oil bath temperature drops during this operation and if required the reaction solution temperature may be raised using a hot water bath. The residue is extracted with toluene and crystallized to yield the title compound as a red crystalline solid.

$^1$H NMR (400 MHz, C$_6$D$_6$, 25° C.) δ (ppm): 0.69, 0.73 ((CH$_3$)$_2$Si, 6H), 2.52 (N(CH$_3$)$_2$, 6H); 5.89–7.54 (12H). $^{13}$C NMR (100 MHz, C$_6$D$_6$, 25° C.) δ (ppm): −2.29, −1.12 ((CH$_3$)$_2$Si), 47.82 (N(CH$_3$)$_2$), 110–135 (aromatic carbons).

Catalyst Preparation and Ethylene Homo and Copolymerization

Catalyst preparation and olefin polymerization are carried out as in Example 1.

EXAMPLE 16

Use of Rac [η$^5$:η$^5$-bis(2-Methyl-inden-1-yl)dimethylsilyl](dimethylamido)zirconium Chloride

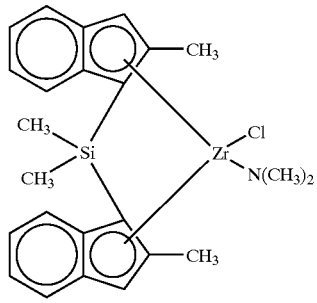

Metallocene Preparation

Under an inert gas atmosphere and at ambient temperature, 425 mg (1.642 mmol) chlorotrisdimethylamido zirconium and 520 mg (1.642 mmol) bis-2-methyl-inden-1-yl dimethylsilane are dissolved in 20 mL mesitylene. The solution is warmed on an oil bath up to the boiling point of the solvent and refluxed for 3 hours. The heating of the oil bath is stopped and the solvent is distilled off under a reduced pressure of 8×10$^{-4}$ Pa. The oil bath temperature drops during this operation and if required the reaction solution temperature may be raised using a hot water bath. The residue is extracted with toluene and crystallized to yield the title compound as a red crystalline solid.

$^1$H NMR (400 MHz, C$_6$D$_6$, 25° C.) δ (ppm): 0.80, 0.88 ((CH$_3$)$_2$Si, 6H), 2.25, 2.27 ([CH$_3$]Ind, 6H), 2.60 (N(CH$_3$)$_2$, 6H), 6.50–7.71 (12H). $^{13}$C NMR (100 MHz, C$_6$D$_6$, 25° C.) δ (ppm): 2.10, 2.44 ((CH$_3$)$_2$Si), 17.38, 18.16 ([CH$_3$]Ind), 49.40 (N(CH$_3$)$_2$), 115–135 (aromatic carbons).

Catalyst Preparation and Ethylene Homo and Copolymerization

Catalyst preparation and olefin polymerization are carried out as in Example 1.

EXAMPLE 17

Use of Rac [η$^5$:η$^5$-bis(Inden-1-yl)dimethylsilyl](dimethylamido)zirconium Bromide

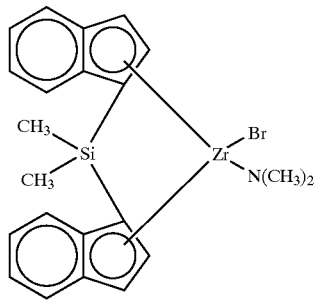

Metallocene Preparation

Under an inert gas atmosphere, 198 mg (0.653 mmol) bromotrisdimethylamido zirconium and 188 mg (0.652 mmol) bis inden-1-yl dimethylsilane are dissolved in 10 mL toluene and the solvent is subsequently distilled off. The remaining solid is heated to 110° C. to form a melt. After 30 minutes the melt is allowed to return to ambient temperature. The red substance is taken up in 5 mL toluene and the solution is filtered. After repeated crystallizations from toluene and hexane at −30° C., the title compound is isolated.

$^1$H NMR (400 MHz, $C_6D_6$, 25° C.) δ (ppm): 0.58 (s, 3H, Si(C$\underline{H}_3$)$_2$), 0.72 (s, 3H, Si(C$\underline{H}_3$)$_2$), 2.46 (s, 6H, N(C$\underline{H}_3$)$_2$), 5.91 (d, 1H, $^3$J(H,H)=3.08 Hz, 5-Ring), 5.98 (d, 1H, $^3$J(H,H)=3.28 Hz, 5-Ring), 6.59 (dd, 1H, $^3$J(H,H)=7.44 Hz, $^3$J(H,H)=7.69 Hz, 6-Ring), 6.73 (d, 1H, $^3$J(H,H)=3.24 Hz, 5-Ring), 6.85 ("dd", 1H, $^3$J(H,H)=7.53 Hz, $^3$J(H,H)=7.60 Hz, 6-Ring), 6.93 ("dd", 1H, $^3$J(H,H)=7.53 Hz, 6-Ring), 6.96 ("dd", 1H, $^3$J(H,H)=8.80 Hz, 6-Ring), 7.04 ("dd", 1H, $^3$J(H,H)=7.75 Hz, $^3$J(H,H)=7.90 Hz, 6-Ring), 7.18 ("t", 1H, $^3$J(H,H)=9.02 Hz, 6-Ring), 7.32 (dd, 1H, $^3$J(H,H)=9.07 Hz, $^3$J(H,H)=8.65 Hz, 6-Ring), 7.44 (dd, 1H, $^3$J(H,H)=7.06 Hz, $^3$J(H,H)=8.43 Hz, 6-Ring), 7.49 (d, 1H, $^3$J(H,H)=8.58 Hz, 6-Ring).

Catalyst Preparation and Ethylene Homo and Copolymerization

Catalyst preparation and olefin polymerization are carried out as in Example 1.

EXAMPLE 18

Use of Rac [η$^5$:η$^5$-bis(1-Indenyl)dimethylsilyl](dimethylamido)zirconium Iodide

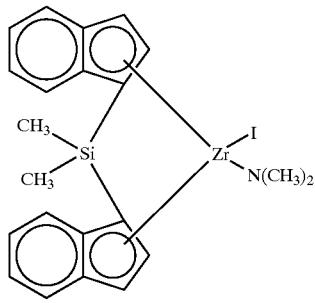

Metallocene Preparation

Under an inert gas atmosphere, 347 mg (0.990 mmol) iodotrisdimethylamido zirconium and 286 mg (0.990 mmol) bis inden-1-yl dimethylsilane are dissolved in 10 mL toluene and the solvent is subsequently distilled off. The remaining solid is heated to 110° C. to form a melt. After 30 minutes the melt is allowed to return to ambient temperature. The red substance is taken up in 5 mL toluene and the solution is filtered. After repeated crystallizations from toluene and hexane at −30° C., the title compound is isolated.

$^1$H NMR (400 MHz, $C_6D_6$, 25° C.) δ (ppm): 0.53 (s, 3H, Si(C$\underline{H}_3$)$_2$), 0.70 (s, 3H, Si(C$\underline{H}_3$)$_2$), 2.42 (s, 6H, N(C$\underline{H}_3$)$_2$), 5.83 (d, 1H, $^3$J(H,H)=3.02 Hz, 5-Ring), 6.00 (d, 1H, $^3$J(H, H)=3.27 Hz, 5-Ring), 6.57 (dd, 1H, $^3$J(H,H)=7.34 Hz, $^3$J(H,H)=7.60 Hz, 6-Ring), 6.65 (d, 1H, $^3$J(H,H)=3.09 Hz, 5-Ring), 6.86 (m, 2H, 6-Ring), 7.16 (m, 1H, 6-Ring), 7.26 (d, 1H, $^3$J(H,H)=9.12 Hz, 6-Ring), 7.28 (d, 1H, $^3$J(H,H)=8.55 Hz, 6-Ring), 7.49 (m, 3H, 6-Ring).

Catalyst Preparation and Ethylene Homo and Copolymerization

Catalyst preparation and olefin polymerization are carried out as in Example 1.

EXAMPLE 19

Use of Rac [η$^5$:η$^5$-2,2-bis(1-Indenyl)propandiyl](dimethylamido)zirconium Chloride

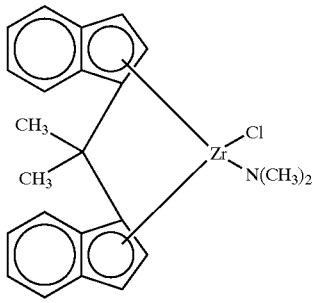

Metallocene Preparation

Under a protective gas atmosphere, 174 mg (0.672 mmol) chlorotrisdimethylamido zirconium and 183 mg (0.672 mmol) 2,2-bisinden-1-yl propane are dissolved in 10 mL mesitylene. The solution is heated under reflux at 165° C. for 2 hours and its color changes to a deep red. The solvent is distilled off under reduced pressure and is replaced by toluene. After filtration the solution is concentrated and cooled to −30° C. The title compound is isolated as a red crystalline solid.

$^1$H NMR (400 MHz, $d_8$-thf, 25° C.) δ (ppm): 2.22 (s, 3H, C(C$\underline{H}_3$)$_2$), 2.39 (s, 3H, C(C$\underline{H}_3$)$_2$), 2.44 (s, 6H, N(C$\underline{H}_3$)$_2$), 6.14 (d, 1H, $^3$J(H,H)=3.51 Hz, 5-Ring), 6.54 (d, 1H, $^3$J(H,H)=3.51 Hz, 5-Ring), 6.59 ("d", 2H, $^3$J(H,H)=3.51 Hz, 5-Ring), 6.75 (dd, 1H, $^3$J(H,H)=6.52 Hz, 6-Ring), 6.87 (m, 1H, 6-Ring), 7.01 (m, 2H, 6-Ring), 7.30 (d, 1H, $^3J(H,H)$=8.64 Hz, 6-Ring), 7.52 (d, 1H, $^3J(H,H)$=8.53 Hz, 6-Ring), 8.04 (d, 1H, $^3J(H,H)$=8.53 Hz, 6-Ring).

Catalyst Preparation and Ethylene Homo and Copolymerization

Catalyst preparation and olefin polymerization are carried out as in Example 1.

EXAMPLE 20

Use of Rac [$\eta^5$:$\eta^5$-bis(2-Methyl-4,5-benzinden-1-yl)dimethylsilyl](dimethylamido)zirconium Chloride

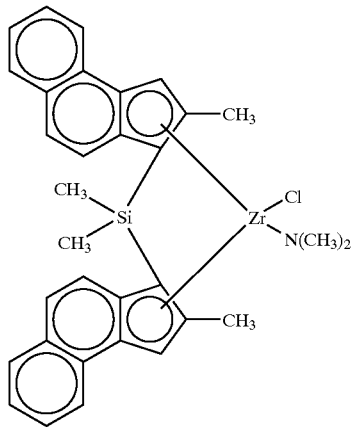

Metallocene Preparation

Under a protective gas atmosphere, 230 mg (0.888 mmol) chlorotrisdimethylamido zirconium and 370 mg (0.888 mmol) bis(2-methyl-4,5-benzinden-1-yl)dimethylsilane are dissolved in 10 mL mesitylene. The solution is heated under reflux at 165° C. for 2 hours and its color changes to a deep red. The solvent is distilled off under reduced pressure and is replaced by toluene. After filtration the solution is concentrated and cooled to −30° C. The title compound is isolated as a red crystalline solid.

$^1$H NMR (400 MHz, $C_6D_6$, 25° C.) δ (ppm): 0.86 (s, 3H, Si(C$\underline{H}_3$)$_2$), 0.91 (s, 3H, Si(C$\underline{H}_3$)$_2$), 2.03 (s, 6H, N(C$\underline{H}_3$)$_2$), 2.37 (s, 3H, 2-$\underline{Me}$Ind), 2.39 (s, 3H, 2-$\underline{Me}$Ind), 7.00–7.88 (m, 14H, Benzindenyl).

Catalyst Preparation and Ethylene Homo and Copolymerization

Catalyst preparation and olefin polymerization are carried out as in Example 1.

EXAMPLE 21

Use of Rac [$\eta^5$:$\eta^5$-1,2-bis(Inden-1-yl)ethane](dimethylamido)zirconium Chloride

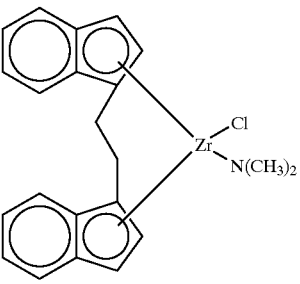

Under an inert gas atmosphere, 1.214 g (2.9 mmol) rac [$\eta^5$:$\eta^5$-1,2-bis(inden-1-yl)ethane]zirconium dichloride and 0.170 g (3.3 mmol) dimethylamido lithium are introduced into 30 mL toluene. The mixture is refluxed for 3 hours, cooled and filtered. The solvent is distilled off and the title compound is isolated as a red powder.

$^1$H NMR (200 MHz, $C_6D_6$, 25° C.) δ (ppm): 2.52 (s, 6H, N(C$\underline{H}_3$)$_2$), 2.83–3.45 (m, 4H, (C$\underline{H}_2$)$_2$), 5.59 (d, 1H, 5-Ring), 5.97 (d, 1H, 5-Ring), 6.31 (dd, 1H, 5-Ring), 6.44 (dd, 1H, 5-Ring), 6.58–7.49 (m, 8H, 6-Ring).

Catalyst Preparation and Ethylene Homo and Copolymerization

Catalyst preparation and olefin polymerization are carried out as in Example 1.

EXAMPLE 22

Use of Rac bis(2-tert.Butyldimethylsiloxy-inden-1-yl)ethylzirconium(dimethylamido)chloride Catalyst Preparation
Carrier Calcination Sylopol 55SJ silica was calcinated under nitrogen for 10 hours at 600° C.

Impregnation of Metallocene 10.3 mg of rac bis(2-tert.butyldimethylsiloxy-inden-1-yl)ethylzirconium(dimethylamido)chloride (prepared analogously to Example 21) was dissolved into 1.3 ml 30 wt % MAO and 0.2 ml toluene was added. This 1.5 ml solution was added to 1.0584 g of the previously prepared silica carrier in a septum bottle. The catalyst was dried in a fume cupboard under a nitrogen flow at 30° C. for one hour. The catalyst has a Zr content of 0.1 wt % and Al/Zr=400.

Ethylene Homopolymerization

Polymerization was carried out in a 2-liter Buchi autoclave in i-butane. The ethylene partial pressure was 5 bar, the 1-hexene content 30 ml, and the temperature was 80° C. 220 mg of the catalyst was fed to the autoclave. After 1 hour of polymerization, the yield of polyethylene was 40.4 g, giving a catalyst activity of 0.17 kg PE/g cat h.

Ethylene Copolymerization

Polymerization was carried out in a 2-liter Buchi autoclave in i-butane. The ethylene partial pressure was 5 bar, the 1-hexene content 30 ml, and the temperature was 80° C. 130 mg of the catalyst was fed to the autoclave. After 1 hour of polymerization, the yield of polyethylene was 98.6 g, giving a catalyst activity of 0.76 kg PE/g cat h.

EXAMPLE 23

Use of Rac bis(2-tert.Butyldimethylsiloxy-inden-l-yl)ethylzirconium(dimethylamido)chloride Catalyst Preparation
Carrier Calcination
Sylopol 55SJ silica was calcinated under nitrogen for 10 hours at 600° C.
Impregnation of Metallocene
19.7 mg of rac bis(2-tert.butyldimethylsiloxy-inden-l-yl)ethylzirconium(dimethylamido)chloride (see Example 22) was dissolved into 1.27 ml 30 wt % MAO and 0.3 ml toluene was added. This 1.5 ml solution was added to 1.0396 g of the previously prepared silica carrier in a septum bottle. The catalyst was dried in a fume cupboard under a nitrogen flow at 30° C. for one hour. The catalyst has a Zr content of 0.2 wt % and Al/Zr=200.

Ethylene Homopolymerization

Polymerization was carried out in a 2-liter Buchi autoclave in i-butane. The ethylene partial pressure was 5 bar, the 1-hexene content 30 ml, and the temperature was 80° C. 220 mg of the catalyst was fed to the autoclave. After 1 hour of polymerization, the yield of polyethylene was 32 g, giving a catalyst activity of 0.15 kg PE/g cat h.
Polymer Properties
BD=420 g/cm$^3$.

Ethylene Copolymerization

Polymerization was carried out in a 2-liter Buchi autoclave in i-butane. The ethylene partial pressure was 5 bar, the 1-hexene content 30 ml, and the temperature was 80° C. 126 mg of the catalyst was fed to the autoclave. After 1 hour of polymerization, the yield of polyethylene was 168 g, giving a catalyst activity of 1.3 kg PE/g cat h.

EXAMPLE 24

Use of Rac bis(2-tert.Butyldimethylsiloxy-inden-l-yl)ethylzirconium(dimethylamido)chloride Catalyst Preparation
Carrier Calcination
Sylopol 55SJ silica was calcinated under nitrogen for 10 hours at 600° C.
Impregnation of Metallocene
38.2 mg of rac bis(2-tert.butyldimethylsiloxy-inden-l-yl)ethylzirconium(dimethylamido)chloride (see Example 22) was dissolved into 1.22 ml 30 wt % MAO. 0.3 ml toluene was added. This 1.5 ml solution was added to 1.0229 g of the previously prepared silica carrier in a septum bottle. The catalyst was dried in a fume cupboard under a nitrogen flow at 30° C. for one hour. The catalyst has a Zr content of 0.4 wt % and Al/Zr=100.

Ethylene Homopolymerization

Polymerization was carried out in a 2-liter Buchi autoclave in i-butane. The ethylene partial pressure was 5 bar, the 1-hexene content 30 ml, and the temperature was 80° C. 218 mg of the catalyst was fed to the autoclave. After 1 hour of polymerization, the yield of polyethylene was 44.5 g, giving a catalyst activity of 0.2 kg PE/g cat h.

Ethylene Copolymerization

Polymerization was carried out in a 2-liter Buchi autoclave in i-butane. The ethylene partial pressure was 5 bar, the 1-hexene content 30 ml, and the temperature was 80° C. 130 mg of the catalyst was fed to the autoclave. After 1 hour of polymerization, the yield of polyethylene was 168 g, giving a catalyst activity of 1.3 kg PE/g cat h.
Polymer Properties
BD=370 g/cm$^3$.

EXAMPLE 25

Use of Rac bis(2-tert.Butyldimethylsiloxy-inden-l-yl)ethylzirconium(dimethylamido)chloride Catalyst Preparation
Carrier Calcination
Sylopol 55SJ silica was calcinated under nitrogen for 10 hours at 600° C.
Impregnation of Metallocene
76.3 mg of rac bis(2-tert.butyldimethylsiloxy-inden-l-yl)ethylzirconium(dimethylamido)chloride (see Example 22) was dissolved into 1.3 ml 30 wt % MAO and 0.2 ml toluene was added. This 1.5 ml solution was added to 1.0584 g of the previously prepared silica carrier in a septum bottle. The catalyst was dried in a fume cupboard under a nitrogen flow at 30° C. for one hour. The catalyst has a Zr content of 0.8 wt % and Al/Zr=50.

Ethylene Homopolymerization

Polymerization was carried out in a 2-liter Buchi autoclave in i-butane. The ethylene partial pressure was 5 bar, the 1-hexene content 30 ml, and the temperature was 80° C. 217 mg of the catalyst was fed to the autoclave. After 1 hour of polymerization, the yield of polyethylene was 56 g, giving a catalyst activity of 0.3 kg PE/g cat h.
Polymer Properties
BD=400 g/cm$^3$.

Ethylene Copolymerization

Polymerization was carried out in a 2-liter Buchi autoclave in i-butane. The ethylene partial pressure was 5 bar, the 1-hexene content 30 ml, and the temperature was 80° C. 129 mg of the catalyst was fed to the autoclave. After 1 hour of polymerization, the yield of polyethylene was 253 g, giving a catalyst activity of 2.0 kg PE/g cat h.
Polymer Properties
BD=360 g/cm$^3$.

EXAMPLE 26 (COMPARATIVE)

Catalyst Preparation

Use of Rac bis(2-tert.Butyldimethylsiloxy-inden-l-yl)ethylzirconiumdichloride
Carrier Calcination
Sylopol 55SJ silica was calcinated under nitrogen for 10 hours at 600° C.
Impregnation of Metallocene
17.6 mg of rac bis(2-tert.butyldimethylsiloxy-inden-l-yl)ethylzirconiumdichloride was dissolved into 1.3 ml 30 wt % MAO and 0.3 ml toluene was added. This 1.5 ml solution was added to 1.0584 g of the previously prepared silica carrier in a septum bottle. The catalyst was dried in a fume cupboard under a nitrogen flow at 30° C. for one hour. The catalyst has a Zr content of 0.2 wt % and Al/Zr=200.

Ethylene Homopolymerization

Polymerization was carried out in a 2-liter Buchi autoclave in i-butane. The ethylene partial pressure was 5 bar, the 1-hexene content 30 ml, and the temperature was 80° C. 226 mg of the catalyst was fed to the autoclave. After 1 hour of polymerization, the yield of polyethylene was 40.4 g, giving a catalyst activity of 0.18 kg PE/g cat h.

Ethylene Copolymerization

Polymerization was carried out in a 2-liter Buchi autoclave in i-butane. The ethylene partial pressure was 5 bar, the 1-hexene content 30 ml, and the temperature was 80° C. 182 mg of the catalyst was fed to the autoclave. After 1 hour of polymerization, the yield of polyethylene was 182 g, giving a catalyst activity of 1.0 kg PE/g cat h.
Polymer Properties
BD=300 g/cm³.

As can be seen by comparison with Example 23 where the Zr content and Al:Zr ratio are the same, the catalyst activity for copolymerization is significantly lower than for the metallocene-amide.

What is claimed is:

1. A heterogeneous olefin polymerization catalyst comprising a porous particulate support material having impregnated therein a metallocene procatalyst of formula II or the reaction product of said metallocene procatalyst and a co-catalyst:

formula II

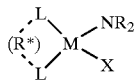

wherein M is a catalytically active transition metal or lanthanide; each L, which may be the same or different, is an alkyl-substituted cyclopentadienyl group, optionally linked via bridging group R*; X is hydrogen, alkyl, aralkyl or halogen; and each R, which may be the same or different, is a hydrocarbyl group or two groups R, together with the intervening nitrogen, are a heterocyclic group.

2. A catalyst as claimed in claim 1 wherein M is Zr, Hf or Ti.

3. A catalyst as claimed in claim 2 wherein M is Zr.

4. A catalyst as claimed in claim 1 wherein $NR_2$ is $N(CH_3)_2$.

5. A catalyst as claimed in claim 1 wherein said support material is an inorganic oxide.

6. A catalyst as claimed in claim 5 wherein said support material is silica.

7. A catalyst as claimed in claim 1 wherein said support material has impregnated therein the reaction product of a said metallocene procatalyst and an aluminoxane co-catalyst.

8. A catalyst as claimed in claim 7 wherein said aluminoxane is methylaluminoxane.

9. A catalyst as claimed in claim 1 containing the metal of said metallocene procatalyst at a content of 0.05 to 2% wt.

10. A catalyst as claimed in claim 1 wherein said metallocene procatalyst is bis(n-butylcyclopentadienyl)(dimethylamido)zirconium chloride.

11. A catalyst as claimed in claim 1 wherein said support material is also impregnated with a cross-linking agent or a surface modifier.

12. A process for the preparation of a heterogeneous olefin-polymerization catalyst, said process comprising (1) obtaining a porous particulate support material;

(2) optionally heat treating said support material;

(3) optionally alkylating said support material;

(4) contacting said support material with a metallocene procatalyst as defined in claim 1 or the reaction product thereof with a co-catalyst;

(5) optionally removing solvent from the resulting impregnated support material; and (6) optionally contacting said support material with a further olefin polymerization catalyst, said metallocene procatalyst and/or a co-catalyst and optionally removing solvent from the resulting impregnated support material; and (7) optionally impregnating said support material with a cross-linking agent or a surface modifier.

13. A process for the homo or copolymerization of an olefin or olefins comprising contacting an olefin monomer with a heterogeneous olefin polymerization catalyst according to claim 1.

14. A process as claimed in claim 13 wherein said monomer comprises ethylene.

15. A heterogeneous olefin polymerization catalyst comprising a porous particulate support material having impregnated therein a metallocene procatalyst or the reaction product of said metallocene procatalyst and a co-catalyst:

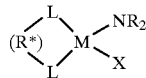

wherein M is a catalytically active transition metal or lanthanide: the two L groups and the (R*) group form a bridged bis(inden-1-yl) group, X is hydrogen, alkyl, aralkyl or halogen; and each R, which may be the same or different, is a hydrocarbyl group or two groups R, together with the intervening nitrogen, are a heterocyclic group.

16. A catalyst as claimed in claim 15 wherein the inden-1-yl groups are substituted in the 2-position or the 3-position.

17. A catalyst as claimed in claim 15 wherein M is Zr, Hf or Ti.

18. A catalyst as claimed in claim 17 wherein M is Zr.

19. A catalyst as claimed in claim 15 wherein $NR_2$ is $N(CH_3)_2$.

20. A heterogeneous olefin polymerization catalyst comprising a porous particulate support material having impregnated therein a metallocene procatalyst or the reaction product of said metallocene procatalyst and a co-catalyst:

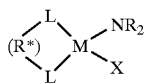

wherein M is a catalytically active transition metal or lanthanide; each L which may be the same or different, is an η-bound ligand, linked via bridging group R* and at least one L group is ring substituted by a silyloxy group, X is hydrogen, alkyl, aralkyl or halogen; and each R, which may be of the same or different, is a hydrocarbyl group or two groups R, together with the intervening nitrogen, are a heterocyclic group.

21. A catalyst as claimed in claim 20 wherein said metallocene is 2,2-ethandiyl bis(2-dimethyl-t-butylsilyloxy-inden-1-yl)(dimethylamido)zirconium chloride.

22. A catalyst as claimed in claim 20 wherein M is Zr, Hf or Ti.

23. A catalyst as claimed in claim 22 wherein M is Zr.

24. A catalyst as claimed in claim 20 wherein $NR_2$ is $N(CH_3)_2$.

* * * * *